US009311691B2

(12) United States Patent
Liu

(10) Patent No.: US 9,311,691 B2
(45) Date of Patent: Apr. 12, 2016

(54) METHOD AND DEVICE FOR PROCESSING A SUPER-RESOLUTION IMAGE

(71) Applicant: DELTA ELECTRONICS, INC., Taoyuan Hsien (TW)

(72) Inventor: Yi-Kuei Liu, Taoyuan Hsien (TW)

(73) Assignee: DELTA ELECTRONICS, INC. (TW)

( * ) Notice: Subject to any disclaimer, the term of this patent is extended or adjusted under 35 U.S.C. 154(b) by 137 days.

(21) Appl. No.: 14/245,285

(22) Filed: Apr. 4, 2014

(65) Prior Publication Data

US 2015/0235345 A1 Aug. 20, 2015

(30) Foreign Application Priority Data

Feb. 17, 2014 (TW) ............................ 103105050 A

(51) Int. Cl.
*G06K 9/00* (2006.01)
*G06T 3/40* (2006.01)
*G06T 5/50* (2006.01)

(52) U.S. Cl.
CPC ............ *G06T 3/4076* (2013.01); *G06T 3/4007* (2013.01); *G06T 5/50* (2013.01); *G06T 2207/10024* (2013.01); *G06T 2207/20224* (2013.01)

(58) Field of Classification Search
CPC .................... G06K 9/4652; G09G 2340/0452; G09G 2340/0407; G09G 2340/0457; G09G 2340/0421; G09G 2340/0414; G09G 5/12; G09G 2320/0276; G09G 2300/0452; H01L 27/14618; H01L 27/14621; H01L 27/14625; H01L 27/14634; H01L 27/1469; H01L 31/0232; G06T 2207/20008; G06T 2207/20024; G06T 2207/20208; G06T 3/4076; G06T 3/4007
USPC ........................................................ 382/167
See application file for complete search history.

(56) References Cited

U.S. PATENT DOCUMENTS

| | | | | |
|---|---|---|---|---|
| 7,385,650 | B2 | 6/2008 | Kondo et al. | |
| 7,525,526 | B2 * | 4/2009 | Brown | G06T 3/4007 345/100 |
| 9,076,224 | B1 * | 7/2015 | Shah | G06T 5/009 |
| 2007/0189748 | A1 * | 8/2007 | Drimbarean | G03B 13/18 396/89 |
| 2008/0152251 | A1 * | 6/2008 | Florent | G06T 5/20 382/260 |
| 2011/0211765 | A1 * | 9/2011 | Nagumo | G06T 3/4053 382/254 |
| 2012/0328210 | A1 | 12/2012 | Fattal et al. | |
| 2013/0050272 | A1 | 2/2013 | Bernard | |

FOREIGN PATENT DOCUMENTS

| | | |
|---|---|---|
| CN | 100366050 | 1/2008 |
| TW | 200740204 | 10/2007 |
| TW | 201232475 | 8/2012 |

* cited by examiner

*Primary Examiner* — Ali Bayat
(74) *Attorney, Agent, or Firm* — Hauptman Ham, LLP

(57) ABSTRACT

An image processing method for processing a super-resolution image and a device thereof are disclosed herein. The image processing method includes the following steps: upscaling an input image to a first image by a factor of n according to an upscaling algorithm; downsampling the input image to a second image by the factor of n; upscaling the second image to a third image by a factor of n according to the upscaling algorithm; subtracting the third image from the input image so as to obtain a first difference image; upscaling the first difference image to a second difference image by a factor of n according to the upscaling algorithm; summing the first image and the second difference image to an output image.

4 Claims, 6 Drawing Sheets

METHOD AND DEVICE FOR PROCESSING A SUPER-RESOLUTION IMAGE

RELATED APPLICATIONS

This application claims priority to Taiwan Application Serial Number 103105050, filed Feb. 17, 2014, which is herein incorporated by reference.

BACKGROUND

1. Field of Invention

The present disclosure relates to an image processing method and a device thereof. More particularly, the present disclosure relates to an image processing method and a device thereof for processing super-resolution images.

2. Description of Related Art

Recently, due to the advancement of display devices, screen sizes of the mobile phones, computers or televisions are getting larger and larger. Moreover, because of the astounding progress in the Internet technology, demand for viewing the images grows rapidly. Since data volumes of normal images are not that small, computation complexity of upscaling the images increases, and the processing time of upscaling the images increases as well.

Normally speaking, common techniques for upscaling images nowadays can be sorted into two groups. One group is based on a database, and the other is based on interpolation. The group, which is based on the database, normally requires a huge amount of low-resolution images and the corresponding high-resolution images. Both the low-resolution images and the high-resolution images are stored in the database. While an user is increasing the resolution of a low-resolution image, the low-resolution image is divided into multiple blocks, and each of the blocks is compared with the low-resolution images stored in the database. When one of the blocks is similar to one of the low-resolution images in the database, the high-resolution image corresponding to the one of the low-resolution images is allocated to a block corresponding to the one of the blocks. Therefore, the group based on the database requires long processing time and large storage capacity, which is not suitable for the device having limited resources.

On the other hand, the other group based on the interpolation method requires less hardware resources. The image upscaling techniques based on interpolation normally start with upsampling of the image. Then, the upsampled image is interpolated by an interpolation algorithm. However, although the techniques based on interpolation achieve faster processing speed, low distortion of the upscaled images is still not stably achieved.

Therefore, under the circumstance with limited hardware resource, there is still a need for a more efficient algorithm so as to increase the processing speed and maintain the quality.

SUMMARY

The disclosure provides an image processing method. The processing method includes the following steps: upscaling an input image to a first image by a factor of n according to an upscaling algorithm; downsampling the input image to a second image by the factor of n; upscaling the second image to a third image by a factor of n according to the upscaling algorithm; subtracting the third image from the input image so as to obtain a first difference image; upscaling the first difference image to a second difference image by a factor of n according to the upscaling algorithm; and summing the first image and the second difference image to an output image, in which n is a positive integer.

The disclosure provides an image processing device. The image processing device includes a first upscaling module, a correction module, and an output module. The first upscaling module is configured to upscale an input image to a first image by a factor of n according to an upscaling algorithm, in which n is a positive integer. The correction module is configured to correct the upscaled first image, in which the correction module is configured to downsample the input image to a second image by a factor of n, to upscale the second image to a third image by a factor of n according to the upscaling algorithm, to subtract the third image from the input image so as to obtain a first difference image, and to upscale the first difference image to a second difference image by a factor of n according to the upscaling algorithm. The output module is configured to sum the first image and the second difference image to an output image.

The disclosure provides an image processing device. The image processing device includes a first upscaling module, a downsampling module, a second upscaling module, a different module, a third upscaling module and an output module. The first upscaling module is configured to upscale an input image to a first image by a factor of n according to the upscaling algorithm, in which n is a positive integer. The downsampling module is configured to downsample the input image to a second image. The second upscaling module is configured to upscale the second image to a third image by a factor of n according to the upscaling algorithm. The difference module is configured to subtract the third image from the input image so as to obtain a first difference image. The third upscaling module is configured to upscale the first difference image to a second difference image by a factor of n according to the upscaling algorithm. The output module is configured to sum the third image and the second difference image to an output image.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
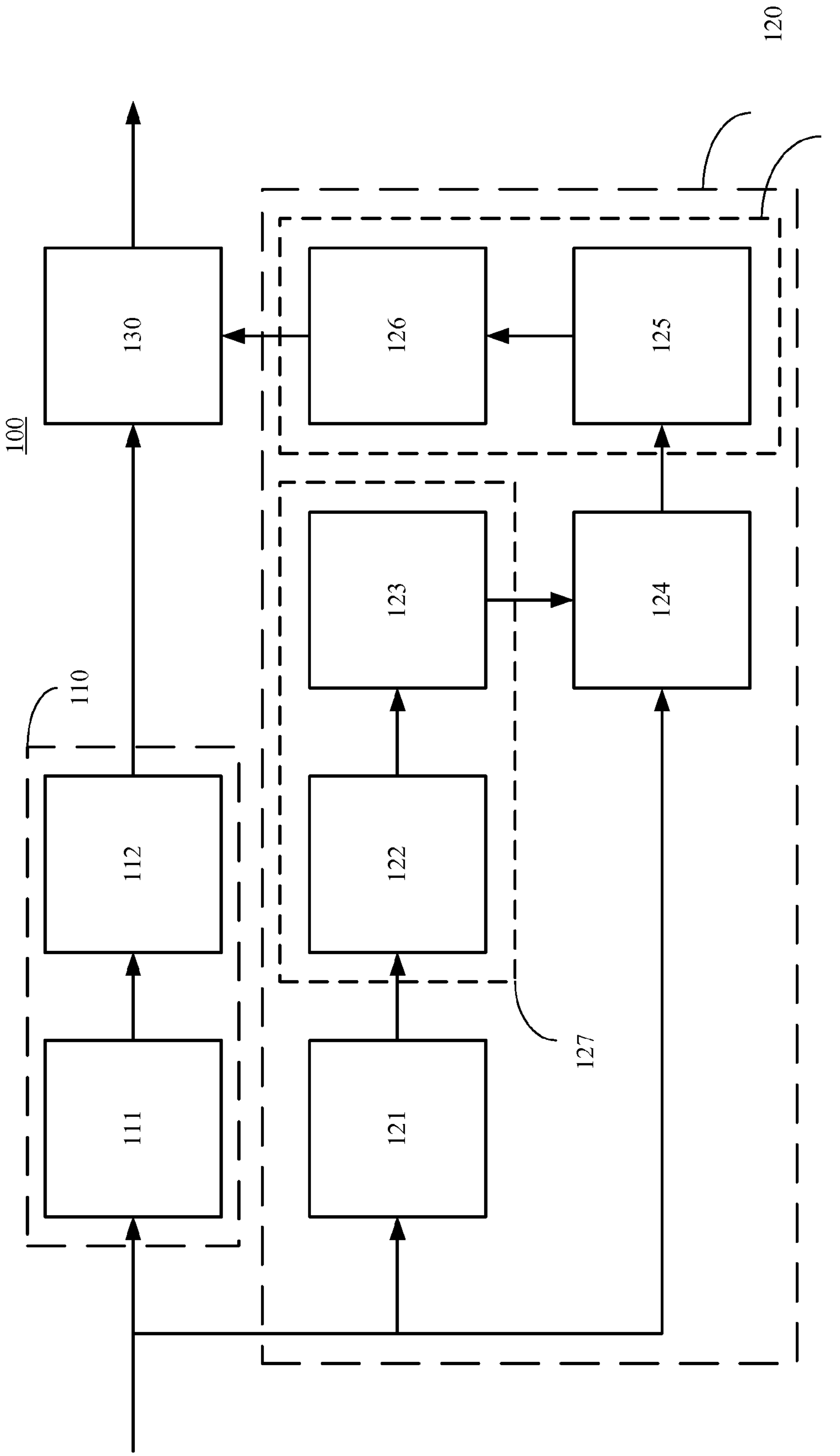
FIG. 1 is a schematic diagram illustrating processing blocks of an image processing device according to one embodiment of this disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Figure 2:
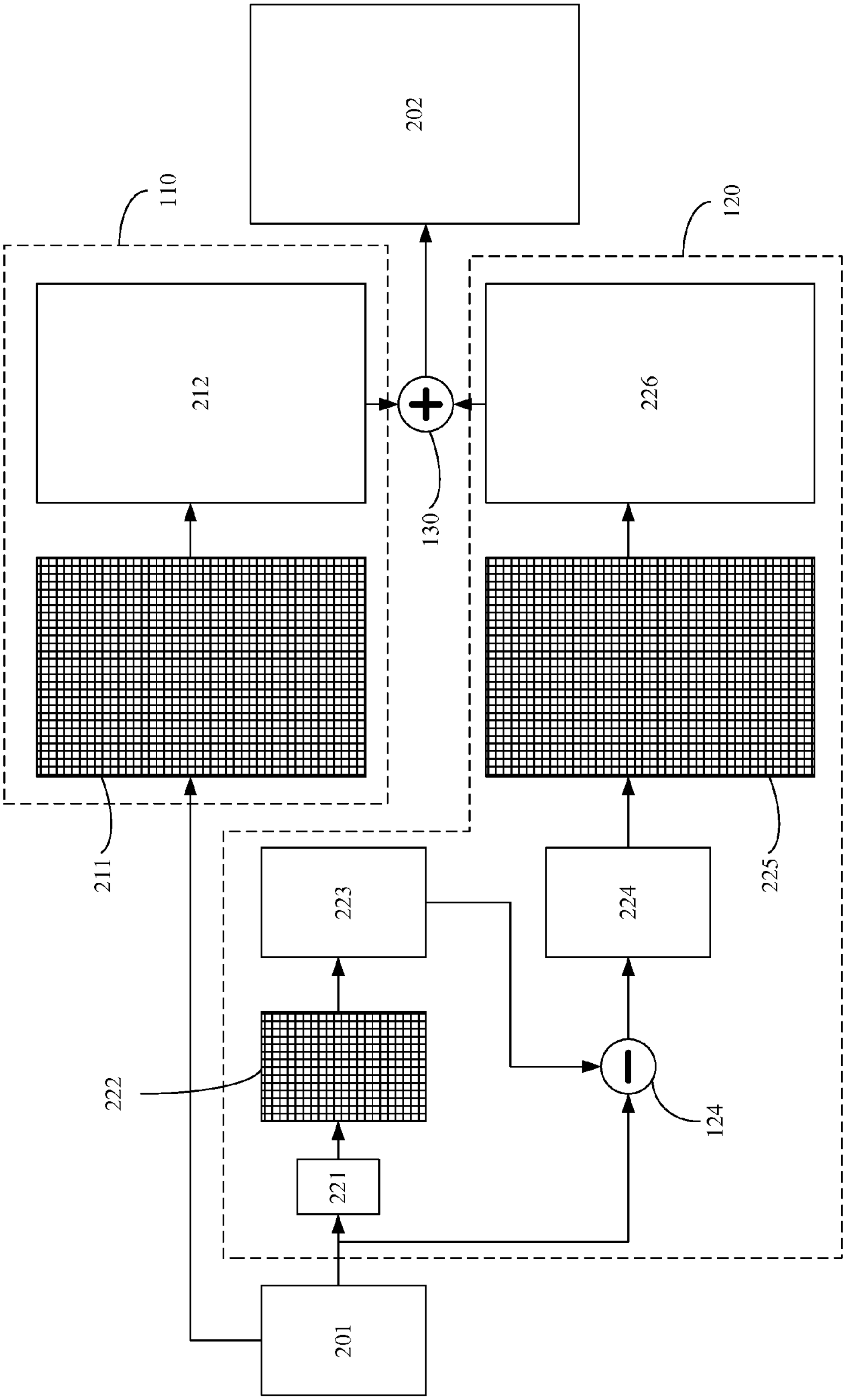
FIG. 2 is a schematic diagram illustrating images generated by the image processing device according to one embodiment of this disclosure.

Reference is made to FIG. 1 and FIG. 2. FIG. 1 is a schematic diagram illustrating processing blocks of an image processing device according to one embodiment of this disclosure. FIG. 2 is a schematic diagram illustrating images generated by the image processing device according to one embodiment of this disclosure. As shown in FIG. 1, the image processing device 100 includes an upscaling module 110, a correction module 120 and an output module 130. The upscaling module 110 is configured to upscale an input image 201 to a first image 212 by a factor of n according to an image upscaling algorithm, and to output the first image 212 to the output module 130, in which n is a positive integer, and the size of the first image 212 is n time greater than the size of the input image 201. The correction module 120 is configured to correct the upscaled first image 201 so as to output the second difference image 226 to the output module 130. At last, the output module 130 sums the first image 212 and the second difference image 226 so as to obtain an output image 202 having super resolution.

In more details, the upscaling module 110 is configured to execute the image upscaling algorithm. The upscaling module 110 includes an allocation unit 111 and an interpolation unit 112. First of all, the allocation unit 111 allocates RGB pixel data of the input image 201 to an intermediate image 211. Then, according to an interpolation algorithm, the interpolation 112 interpolates the remaining pixels of the intermediate image 211 based on the allocated RGB pixel data so as to obtain the first image 212. The interpolation unit 112 further outputs the first image 212 to the output module 130.

The correction module 120 includes a downsampling unit 121, an upscaling unit 127, a difference unit 124 and an upscaling unit 128. The upscaling unit 127 includes an allocation element 122 and an interpolation element 123. The upscaling unit 128 includes an allocation element 125 and an interpolation element 126. An image upscaling algorithm executed by the upscaling unit 127 and an image upscaling algorithm executed by the upscaling unit 128 are the same image upscaling algorithm.

In operation, the downsampling unit 121 downsamples the input image 201 to a second input image 221 by a factor of n. Then, the allocation element 122 of the upscaling unit 127 allocates the RGB pixel data of the second image 221 to the intermediate image 222. The interpolation element 123 of the upscaling unit 128 interpolates pixels of the intermediate image 222 to a third image 223.

Figure 3:
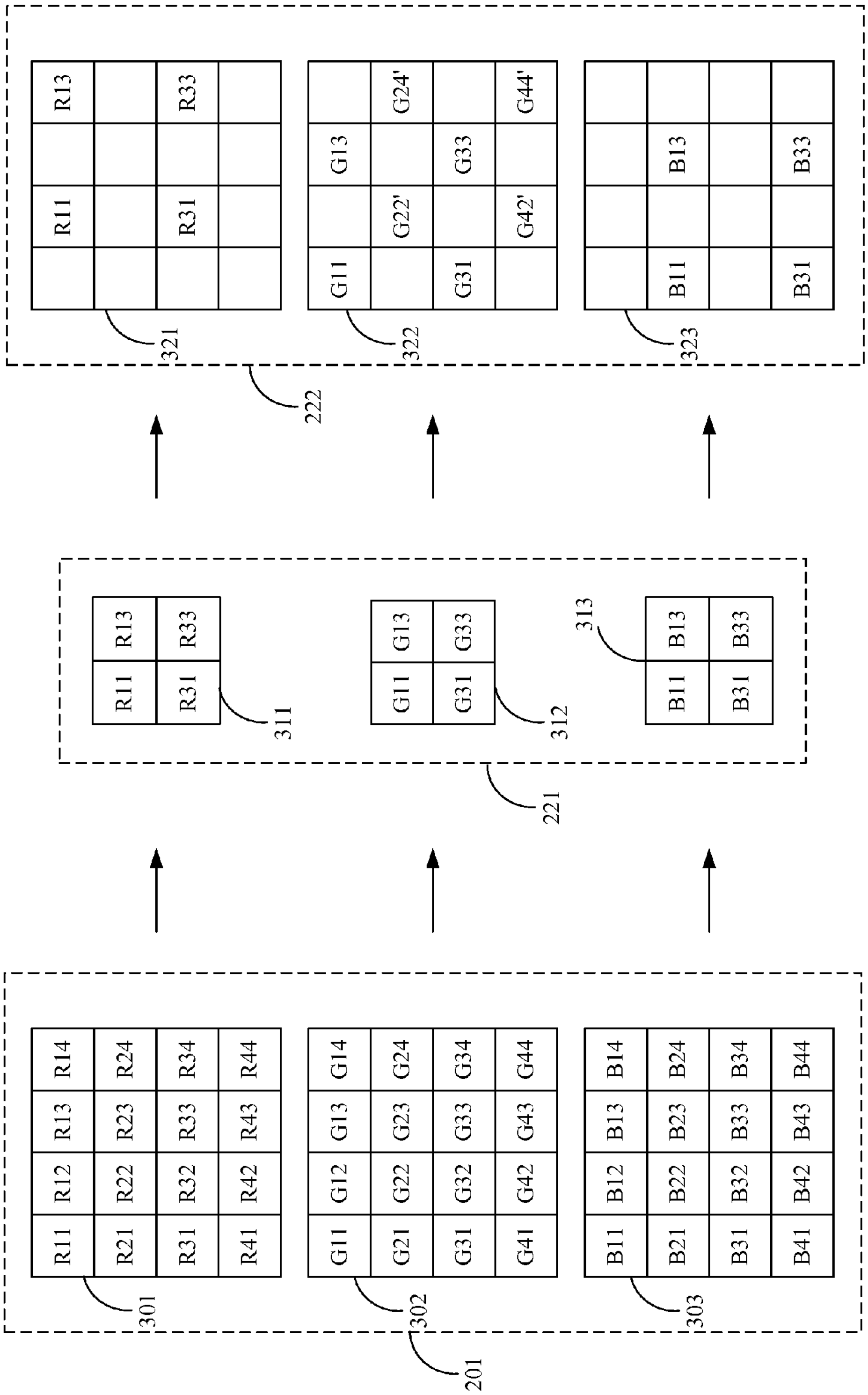
FIG. 3 is a schematic diagram illustrating pixel allocation of downsampling and pixels allocation based on a Bayer pattern according to one embodiment of this disclosure.
Figure 4:
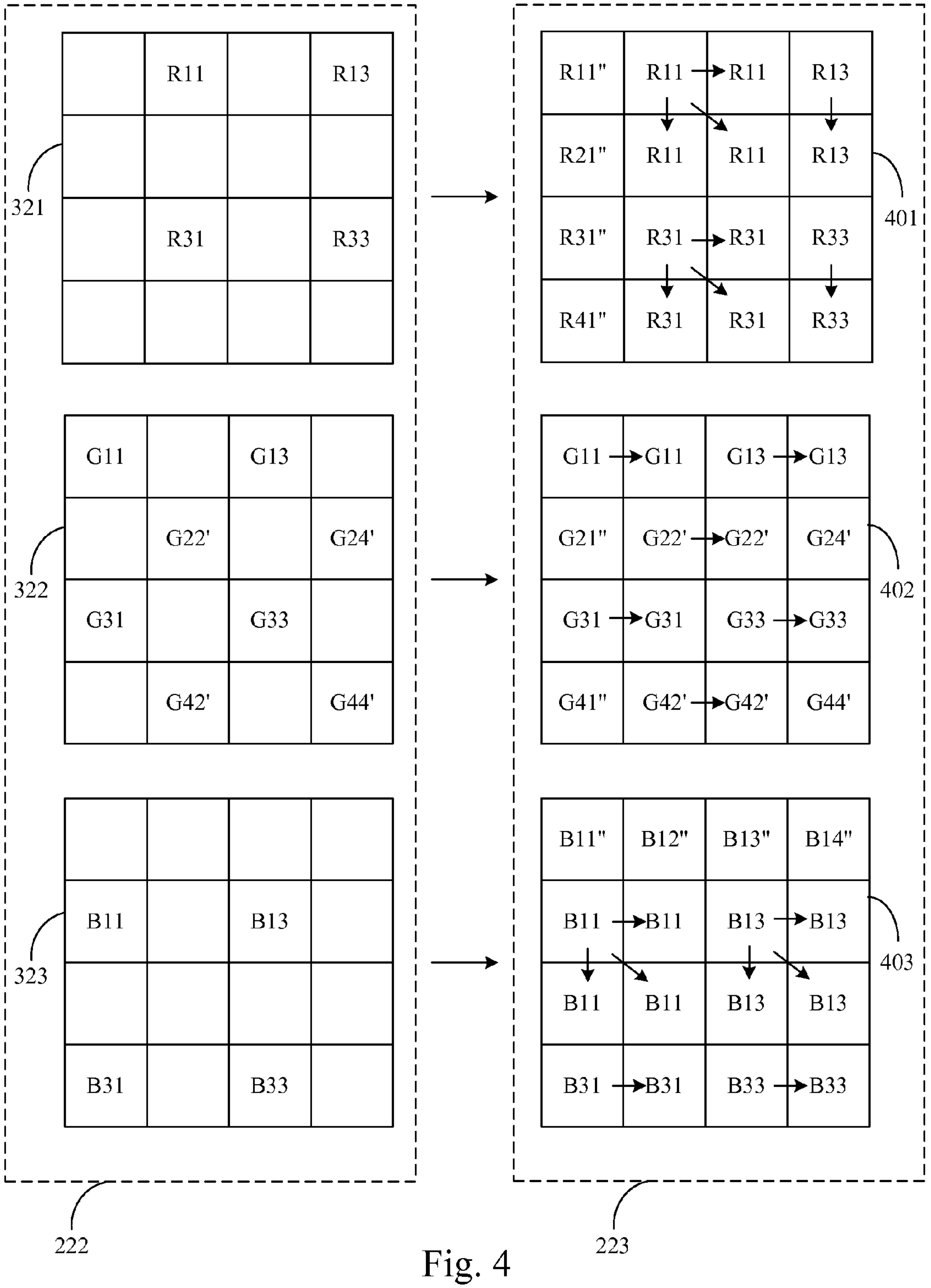
FIG. 4 is a schematic diagram illustrating a nearest neighbor interpolation according to one embodiment of this disclosure.
Figure 5:
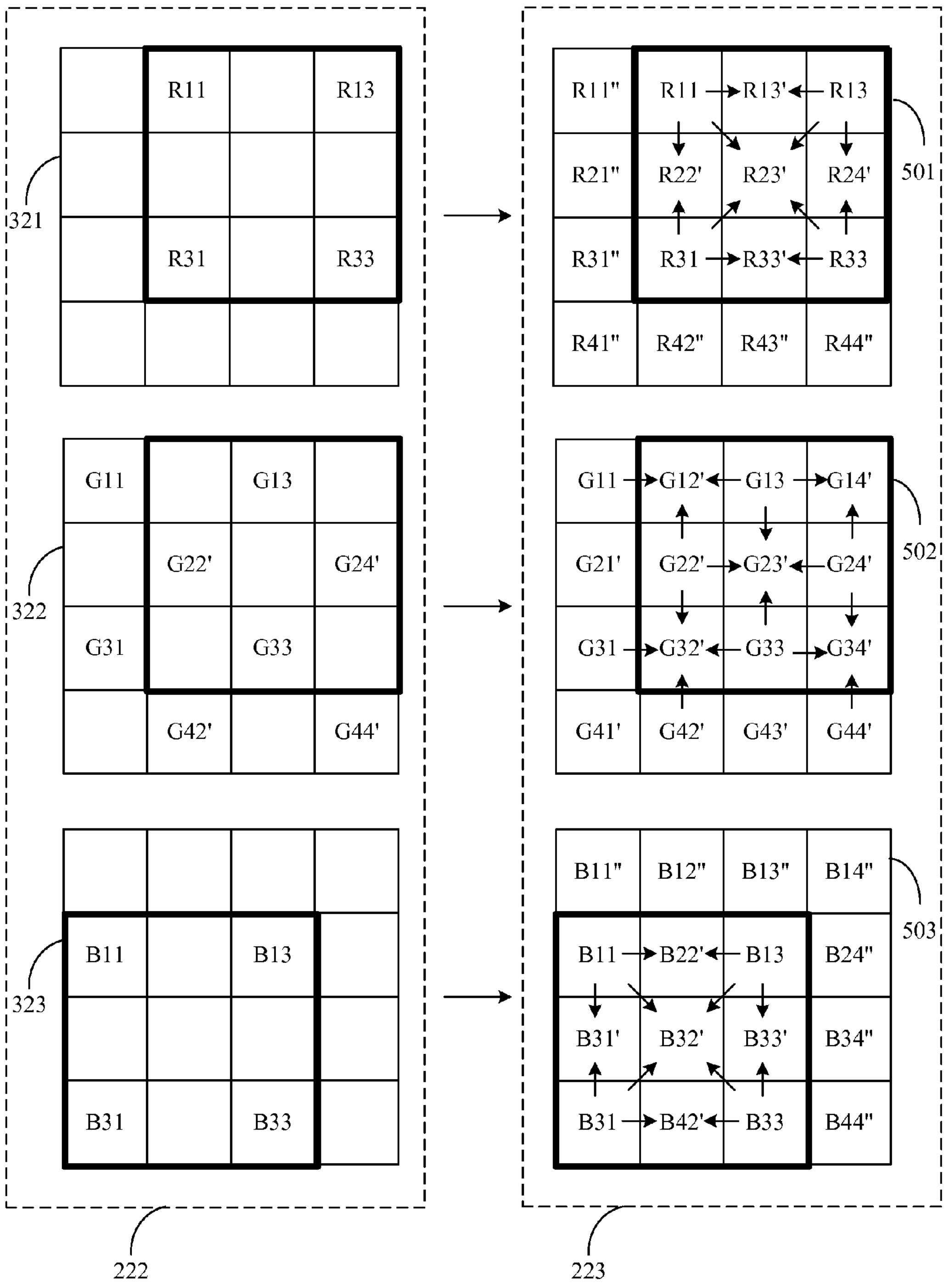
FIG. 5 is a schematic diagram illustrating a bilinear interpolation according to one embodiment of this disclosure.

In more details, the references are made to FIG. 3-FIG. 5 so as to illustrate the operations of the downsampling unit 121 and the upscaling unit 127. In some embodiments, the color filter matrix can be a Bayer pattern. FIG. 3 is a schematic diagram illustrating pixel allocation of downsampling and pixels allocation based on a Bayer pattern according to one embodiment of this disclosure. As shown in FIG. 3, the size of the input image is 4×4 (i.e., length×width), and the input image 201 includes pixel data 301 corresponding to the red color, pixel data 302 corresponding to the green color and the pixel data 303 corresponding to the blue color. The pixel data 301 includes sixteen pixels $R_{ij}$, the pixel data 302 includes sixteen pixels $G_{ij}$, and the pixel data 303 includes sixteen pixels $B_{ij}$, in which each of the index i and the index j ranges from 1 to 4.

In some embodiments, the number of pixels is not restricted to 16 in the input image 201.

First of all, the downsampling unit 121 respectively downsamples the pixel data 301, the pixel data 302 and the pixel data 303 of the input image by a factor of two so as to obtain the second image 221. In the present embodiment, the operation of downsampling by a factor of 2 samples pixels corresponding to the interconnections of the odd-number rows and the odd-number columns, but it is not restricted to this. Therefore, the size of pixel data 311 is 2×2, and the pixel data 311 includes pixels R11, R13, R31 and R33; in the same way, the sizes of pixel data 312 and pixel data 313 are respectively 2×2. The pixel data 312 includes pixels G11, G13, G31 and G33. The pixel data 313 includes pixels B11, B13, B31 and B33.

Afterwards, the allocation element 122 of the upscaling unit 127 respective allocates the pixel data 311, 312 and 313 to the pixel data 321, 322 and 323 so as to obtain the immediate image 222, in which the sizes of the pixel data 321, 322 and 323 are respectively two times greater than the size of the pixel data 311, 312 and 313.

What should be noticed is that the pixel data 322 corresponding to the green color includes twice more pixels than the pixel data 321 corresponding to the blue color 321 or the pixel data 323 corresponding to the blue color. It is because that a dynamic range of the green color corresponding to the eyes of human beings is larger. In other words, the green color brings more information to the eyes of human beings. As a result, the pixel data 322 includes not only the pixels G11, G13, G31 and G33 of the pixel image 312 but also interpolated pixels G22', G24', G42' and G44'.

In some embodiments, non-edge pixels G22' is determined based on the pixels G11, G13, G31 AND G33. First of all, a value difference of the pixel G11 and G33 is compared to a value difference of the pixel G13 and G31. When the value difference of the pixels G11 and G33 is smaller than the value difference of the pixels G13 and G31, the value of the pixel G22' is determined as an average of values corresponding to the pixels G11 and G33. On the other hand, when the value difference of the pixels G11 and G33 is greater than the value difference of pixels G13 and G31, the value of the pixel G22' is determined as an average of values corresponding to the pixels G13 and G31. When the value difference of the pixels G11 and G33 is equal to the value difference of the pixels G13 and G31, the value of the pixel G22' is determined as an average of values corresponding to the pixels G11, G13, G31 and G33. In other words, the value corresponding to the pixel G22' is interpolated by the diagonal pixels whose values have less difference.

In some embodiments, the non-edge pixel G22' can be an average of the values corresponding to the pixels G11, G13, G31 and G33.

In some embodiments, values of the edge pixels G24', G42' and G44' can be determined based on values of the closest pixel data. The value of the pixel G24' can be an average of values corresponding to the pixels G13 and G33. The value of the pixel G42' can be an average of values corresponding to the pixels G11 and G33. The value of the pixel G44' can be the value corresponding to the pixel G33.

Next, two interpolation algorithms are taken as examples in order to clearly illustrate an operation of the interpolation element 123 in the upscaling unit 127. In some embodiments, the interpolation algorithm can be the nearest neighbor interpolation. FIG. 4 is a schematic diagram illustrating a nearest neighbor interpolation according to one embodiment of this disclosure. As shown in FIG. 4, interpolation element 123 interpolates the pixel data 321, 322 and 323 of the intermediate image 22 to the pixel data 401, 402 and 403 of the third image 223. First of all, in the image 321, interpolation element 123 determines the pixels which are on the right, at the bottom or at the bottom right of the pixel R11 as the value corresponding to the pixel R11, and the interpolation element 123 also determines the pixels which are on the right, at the bottom and at the bottom right (the mentioned directions are not restricted, e.g. the three directions may also be the left, the bottom and the bottom left) of the pixel R33 as the value corresponding to the pixel R33. Moreover, the interpolation element 123 also determines the pixels which are at the bottom of the pixel R11 and R33 as the values corresponding to the pixels R11 and R33 respectively. As a result, the pixel data 401 is obtained. The edge pixels R11", R21", R31" and R41" can be determined by the neighbor pixels. In the same way, interpolation element 123 can interpolate the pixel data 323 to the pixel data 403.

On the other hand, in the pixel data 322, interpolation 123 first determines pixels on the right of the pixels G11, G13, G22', G31, G33 and G42 as the values of the pixels G11, G13, G22', G31, G33 and G42 respectively. Then, the interpolation element 123 determines values of pixels at the bottom of the pixels G11 and G31 as the values of the pixels G11 and G31 respectively so as to obtain the pixel data 402.

In some embodiments, the value of an edge pixel R11" can be set as a value of a pixel R11 which is the closest to the edge pixel R11". In the same way, values of the pixels R21"、R31"、R41"、B11"、B12"、B13" and B14" can also be determined based on those mentioned above, in which the closest pixels of pixels B11", B12", B12" and B14" are pixels at the bottom of the pixels B11", B12", B12" and B14".

In some embodiments, the interpolation algorithm can be a bilinear interpolation. FIG. 5 is a schematic diagram illustrating a bilinear interpolation according to one embodiment of this disclosure. As shown in FIG. 5, the interpolation element 123 interpolated pixel data 321, 322 and 323 to pixel data 501, 502 and 503 corresponding to the third image 223. In the block 504 of the image 321, a pixel containing no value can be determined based on pixels on the top and pixels at the bottom, the pixels on the right and pixels on the left or the pixels on the diagonal lines. As shown in pixel data 501, value of the pixel R13' is the average of the values corresponding to the pixels R11 and R13. A value of the pixel R22' is the average of the values corresponding to the pixels R11 and R31. The pixel data R23' are determined based on the values corresponding to the diagonal pixels R11, R13, R31 and R33. In the same way, the block 506 of the pixel data 323 also used the same interpolation algorithm so as to obtain the block 509 of the pixel data 503. The edge pixels R11", R21", R31", R41", R42", R43" and R44' of the pixel data 501 are determined based on the pixels which are the closest to the edge pixels, in which the pixels include values. In the same way, interpolation unit 123 uses the mentioned interpolation algorithm to interpolate the pixel data 323 so as to generate pixel data 503

Next, as shown in the block 505 of the pixel data 322, a pixel containing no value can be determined based pixel on the top, the pixel at the bottom, the pixel on the right and the pixel on the left. As shown in block 508 of the pixel data 502, a value of the pixel G23' is the average of values corresponding to the pixel G13, G22', G33 and G24'. If there is no pixel in one direction of the pixel, the value of the pixel is determined based on pixels in the other three directions. For example, a value of the pixel G12' is determined based on the pixels G11, G22' and G13. If there are no pixels in two directions of one pixel, the value of the pixel is determined based on pixels in two directions. For example, the value of the pixel G14' is determined based on the pixels G13 and G24'. In the same way, the interpolation element 123 can interpolate the remaining pixels of the pixel data 322 according to those mentioned above so as to generate the pixel data 502.

In some embodiments, the interpolation algorithm can be smooth hue transition interpolation, edge sensing interpolation, edge directing interpolation, Laplacian second-order interpolation, threshold-based variable number of gradient interpolation, pattern recognition interpolation or alternating projection。

Reference is made back to FIG. 1 and FIG. 2. After the third image 223 is outputted to the difference unit 124, the difference unit 124 subtracts pixels of the third image 223 from the corresponding pixels of the input image 201 so as to obtain a first difference image 224. The upscaling unit 128 upscales the first difference image 224 to a second difference image 226 by a factor of n according to the upscaling algorithm. The second difference image 226 is outputted to the output module 130.

At last, the output module 130 sums the first image 212 and the second difference image 226 so as to obtain an output image 202. In some embodiments, the output module 130 is further configured to cut the edge pixels of the output image 202, which removes the edge pixels having high distortion.

In some embodiments, the allocation unit 111, the allocation element 122 and the allocation element 125 can be a same computing unit or a same computing element. The interpolation element 123, the interpolation unit 112 and the interpolation element 126 can be same computing unit or a same computing element.

The modules, units and elements mentioned above can be implemented as computation programs, and the computer programs can be stored in computer-readable storage medium. Accordingly, a processing unit reads and executes the programming computation programs of the computer-readable storage medium. In some embodiments, the computer-readable storage medium can be read-only memory, flash memory, soft disk, hard disk, compact disk, USB drive, magnetic tape, database accessed by internet network or other types of storage components.

Figure 6:
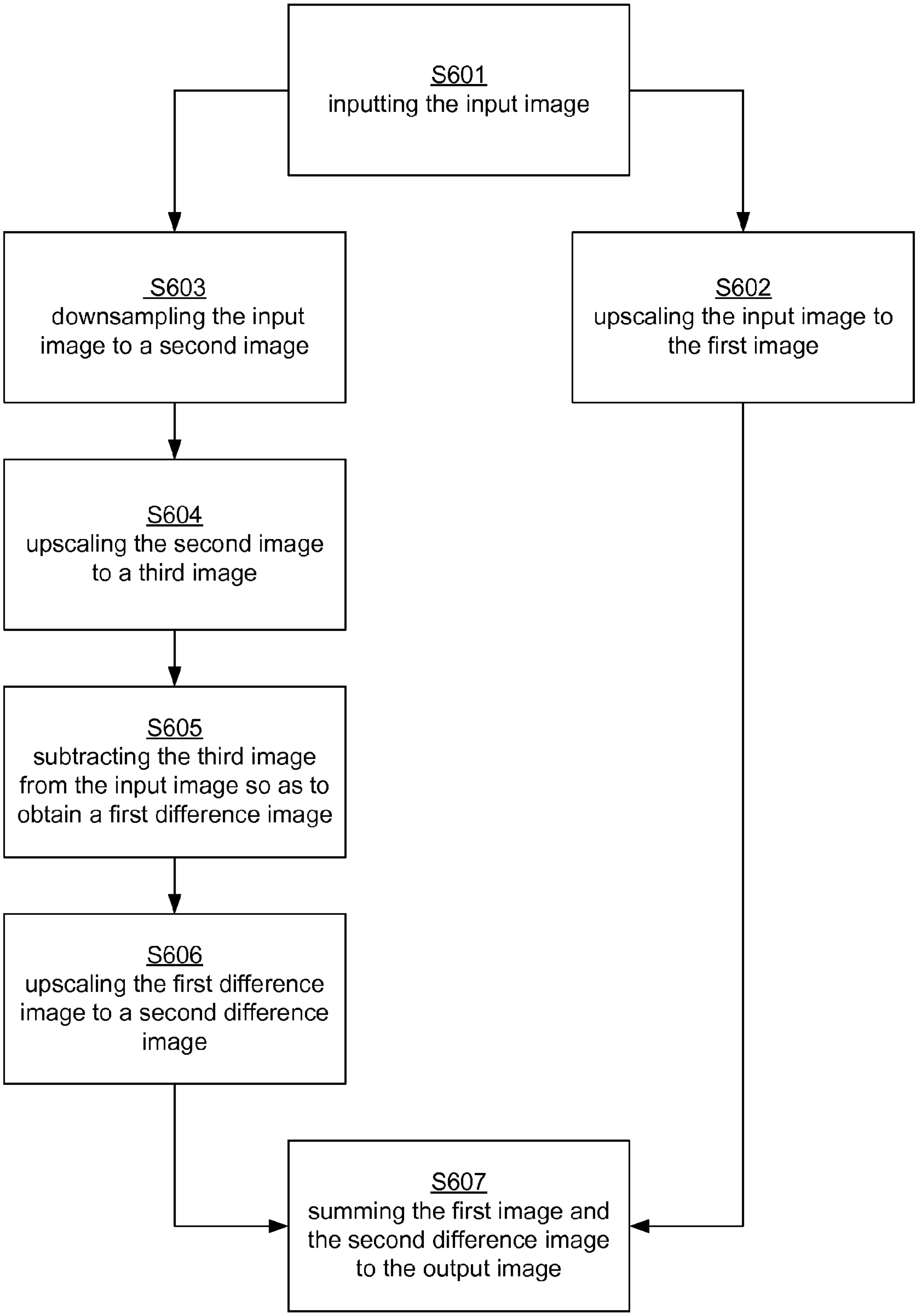
FIG. 6 is a flow diagram illustrating a super-resolution image processing method according to one embodiment of this disclosure.

Reference is also made to FIG. 6 in order to clearly illustrate a flow of an image processing method processing the super-resolution images in the image processing device 100. FIG. 6 is a flow diagram illustrating an image processing method for processing the super-resolution images according to one embodiment of this disclosure. The method including the following steps: inputting the input image 201 (step S601); upscaling the input image to the first image 212 by a factor of n according to an upscaling algorithm (step S602); on the other hand, downsampling the input image 201 to a second image 221 by the factor of n (step S603); then, upscaling the second image 221 to a third image 223 by a factor of n according to the upscaling algorithm (step S604); subtracting the third image 223 from the input image 201 so as to obtain a first difference image 224 (step S605); upscaling the first difference image 224 to a second difference image 226 by a factor of n according to the upscaling algorithm (step S606); and summing the first image 212 and the second difference image 226 so as to obtain the output image 202 (step S607).

In some embodiments, the image processing method shown in FIG. 6 may take the form of a computer program product stored in a computer-readable storage medium. The computer can read the storage medium so as to executing the image processing method. The computer-readable storage medium can be read-only memory, flash memory, soft disk, hard disk, compact disk, USB drive, magnetic tape, database accessed by internet network or other types of storage components.

Based on those mentioned above, the present disclosure compared with other existing techniques has apparent advantages and beneficial results. The image processing method and the image processing device provided by the present disclosure upscale the image in a faster way and keep low distortion of the upscaled images at the same time.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An image processing method, comprising:

upscaling an input image to a first image by a factor of n according to an upscaling algorithm;

downsampling the first image to a second image by the factor of n;

upscaling the second image to a third image by a factor of n according to the upscaling algorithm;

subtracting the third image from the input image so as to obtain a first difference image;

upscaling the first difference image to a second difference image by a factor of n according to the upscaling algorithm, further comprising:

allocating the first difference image to an intermediate image according to a color filter matrix; and interpolating the intermediate image to the second difference image according to an interpolation algorithm, wherein sizes of the intermediate image and the second difference are each n times greater than a size of the input image; and summing the first image and the second difference image to an output image, wherein n is a positive integer.

2. The image processing method of claim 1, wherein the interpolation algorithm is nearest neighbor interpolation, bilinear interpolation, smooth hue transition interpolation, edge sensing interpolation, edge directing interpolation, Laplacian second-order interpolation, threshold-based variable number of gradient interpolation, pattern recognition interpolation or alternating projection.

3. The image processing method of claim 1, wherein the color filter matrix is Bayer pattern.

4. A non-transitory computer readable storage medium with a computer program to execute an image processing method, comprising:

upscaling an input image to a first image by a factor of n according to an upscaling algorithm;

downsampling the first image to a second image by the factor of n;

upscaling the second image to a third image by a factor of n according to the upscaling algorithm;

subtracting the third image from the input image so as to obtain a first difference image;

upscaling the first difference image to a second difference image by a factor of n according to the upscaling algorithm, further comprising:

allocating the first difference image to an intermediate image according to a color filter matrix; and interpolating the intermediate image to the second difference image according to an interpolation algorithm, wherein sizes of the intermediate image and the second difference are each n times greater than a size of the input image; and summing the first image and the second difference image to an output image, wherein n is a positive integer.

* * * * *